United States Patent
Gorcea et al.

(10) Patent No.: US 7,123,897 B2
(45) Date of Patent: Oct. 17, 2006

(54) DIRECTIONAL RECEIVER COUPLING ARRANGEMENT WITH FREQUENCY SELECTIVITY AND GAIN CONTROL FOR DSL

(75) Inventors: Dan V Gorcea, Kanata (CA); Robert M Thomas, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 452 days.

(21) Appl. No.: 10/751,635

(22) Filed: Jan. 6, 2004

(65) Prior Publication Data

US 2004/0248613 A1   Dec. 9, 2004

Related U.S. Application Data

(62) Division of application No. 09/466,663, filed on Dec. 20, 1999, now Pat. No. 6,681,012.

(60) Provisional application No. 60/155,733, filed on Sep. 23, 1999.

(51) Int. Cl.
   *H04B 1/28* (2006.01)
   *H04M 9/00* (2006.01)
   *H04M 1/00* (2006.01)
   *H04B 17/00* (2006.01)

(52) U.S. Cl. .................. 455/333; 379/402; 379/390.04

(58) Field of Classification Search ................ 455/333, 455/296, 63.1, 501, 115.1, 114.2, 67.13; 379/402, 379/403, 398, 414, 390.04, 399.01, 392.01; 375/221, 222, 346
   See application file for complete search history.

(56) References Cited

U.S. PATENT DOCUMENTS 5,541,990 A * 7/1996 Rahamim .................... 379/402
5,822,426 A * 10/1998 Rasmus et al. ............. 379/402
6,369,650 B1 * 4/2002 Hayat-Dawoodi ........... 330/69
6,370,364 B1 * 4/2002 Liimatainen ................ 455/126
6,445,791 B1 * 9/2002 Grisamore et al. ......... 379/402
6,487,264 B1 * 11/2002 Alley et al. ................. 375/361
6,681,012 B1 * 1/2004 Gorcea et al. .............. 379/402
6,771,770 B1 * 8/2004 Casier et al. ............... 379/402
6,922,464 B1 * 7/2005 Bailey ....................... 379/1.03

FOREIGN PATENT DOCUMENTS

EP   0 820 154 A2   1/1998
EP   0 840 474 A2   5/1998

OTHER PUBLICATIONS

Kim Maxwell, "Asymmentric Digital Subscriber Line: Interim Technology for the Next Forty Years", IEEE Communications Magazine, vol. 34. No. 10., Oct. 1, 1996, pp. 100-106, Piscataway, NJ. USA.

* cited by examiner

*Primary Examiner*—Sonny Trinh
(74) *Attorney, Agent, or Firm*—Kent Daniels; Ogilvy Renault LLP

(57) ABSTRACT

A directional coupler for a modem has a high common mode noise rejection characteristic with low transmit signal leakage, and reduced distortion of components mixed with a received signal. A primary filter network is connected to a communications circuit. The primary filter network has an output connected to an input of an amplifier. A feedback network is connected between the input and output of the amplifier. The primary filter network, the amplifier and the feedback network are arranged to provide a virtual ground at the input of the amplifier, and a filter characteristic which attenuates frequencies in the transmit signal band. The advantage is reduced component count while providing excellent transmit signal rejection and reducing received signal distortion.

21 Claims, 7 Drawing Sheets

DIRECTIONAL RECEIVER COUPLING ARRANGEMENT WITH FREQUENCY SELECTIVITY AND GAIN CONTROL FOR DSL

CROSS-REFERENCE TO RELATED APPLICATIONS

This application is a divisional application of U.S. patent application No. 09/466,663 filed Dec. 20, 1999 now U.S. Pat. No. 6,681,012, which claims benefit under 35 U.S.C. 119(e) of U.S. Provisional Patent Application No. 60/155,733 filed on Sep. 23, 1999.

MICROFICHE APPENDIX

Not applicable.

TECHNICAL FIELD

The invention relates in general to data signal processing and, in particular, to a hybrid circuit within a modem for coupling to a telephone line to improve received signal discrimination.

BACKGROUND OF THE INVENTION

Most users of data communications services access data communications networks (e.g. the Internet) using dial-up connections established through the Public Switched Telephone Network (PSTN). The PSTN is still substantially an analog communications network designed, before the advent of digital communications, to transmit sounds in the audible range of the human voice.

Digital data is transported across the PSTN by converting the data into an analog signal that is transmitted by varying, or modulating, the frequency, phase, amplitude or other characteristic of a carrier signal. The modulation is performed by a modem attached to a standard telephone line referred to as a "local loop". When analog signals are received from other modems in the PSTN, the receiving modem performs an opposite function by demodulating the received analog signal to convert it back into digital data.

Analog signals are simultaneously transmitted and received by the modem through the local loop. Thus the local loop carries a mixed signal that includes a combination of both transmit (Tx) signals being sent by the modem, and receive (Rx) signals being received by the modem. The modem must therefore separate the Tx and Rx signals so that a substantially uncorrupted Rx signal can be supplied to the demodulation portion of the modem. The separation of the Tx and Rx signals is commonly performed using a circuit known as a hybrid circuit, which is located between the modem's modulation/demodulation circuits and the local loop.

As is well known in the art, a classical hybrid circuit includes a line driver that energizes a line transformer through an impedance (typically a resistor) chosen to provide an appropriate termination impedance for the local loop (which is usually a complex value). In order to separate the Rx signals from the mixed signal on the local loop, the signal line is tapped at a first tap point (proximal the line transformer) and supplied to a summing circuit (typically a differential amplifier). The Tx signal is also supplied to the summing circuit by tapping at a second tap point in a compensation network. The purpose of the compensation network is to provide a branch line from the line driver (source of Tx signals) in which the strength of the Tx signal is directly proportional (preferably equal) to the Tx signal strength at the first tap point, while the Rx signal strength is strongly attenuated. The summing circuit can then isolate the Rx signal from the mixed signal by finding a difference between the signals obtained at the first and second tap points.

In practice, the effectiveness of this classical hybrid circuit depends on the match between the impedance of the line ($Z_{LINE}$) and that of the compensation network ($Z_{BAL}$). In particular, if $Z_{BAL}=k*Z_{LINE}$ (where k is a constant) at all frequencies, then the summing circuit will completely remove the Tx signal from the mixed signal, and none of the Tx signal will "leak" past the summing circuit.

However, the impedance of the local loop cannot be matched by a generic compensation network, because it depends on several factors (e.g. loop length, physical properties, loop topology, and the presence of bridged taps, etc.) that are termination-specific. Consequently, in practice, $Z_{BAL}<>k*Z_{LINE}$ and at least some of the Tx signal will leak past the summing circuit. This Tx signal leakage appears as noise in the Rx signal supplied to the demodulator of the modem. This noise (Tx leakage) may include distortion components generated by the line driver, and may also cause distortions in the demodulator that fall in the Rx signal frequency band and cannot be separated from the useful Rx signal.

Additionally, at a minimum usable Rx signal strength, common-mode noise originating from multiple sources (e.g., Vcc, ground, capacitive coupling, etc.) may rival the Rx signal strength. If this occurs, the Rx signal integrity will be severely compromised, resulting in an unacceptably low signal-to-noise ratio.

It is known that Tx signal leakage can be reduced by inserting filters between the tap points and the summing circuit. The filters can be tuned to attenuate signals in the Tx frequency band, without attenuating the Rx signals. While such filters reduce Tx signal leakage, the filter circuits may induce the same distortion problems discussed above, resulting in distortion components (within the Rx frequency band) that are applied to the inputs of the summing circuit. As is well known, those distortion components cannot be separated from the useful Rx signal. In addition, the filter circuits do not address problems associated with common-mode noise.

As taught in U.S. Pat. No. 5,822,426 (Rasmus et al.), which issued Oct. 13, 1998, the problem of common-mode noise can be addressed by using a balanced pair of line drivers, respectively generating complementary Tx+ and Tx− signals (or by inverting the mixed signal derived at the second (Tx) signal tap). This effectively eliminates common-mode noise supplied to the input of the summing amplifier that extracts the Rx signal. However, Rasmus et al. do not address the problems of Tx signal leakage or distortion.

Accordingly, there remains a need for an improved circuit for coupling a modem receiver (demodulator) to a signal line that carries transmit and receive signals simultaneously.

SUMMARY OF THE INVENTION

It is therefore an object of the present invention is to provide a directional coupler having high common-mode noise rejection and low transmit signal leakage, while substantially avoiding distortion of components mixed with a received signal.

Accordingly, an aspect of the present invention provides a directional coupler for coupling a signal receiver to a communications circuit having a signal line adapted to simultaneously carry a transmit (Tx) signal sourced from a line driver circuit and a receive (Rx) signal and a compensation network connected to an output of the line driver for balancing an impedance of the signal line. The directional coupler circuit comprises a primary network connected to the communications circuit and having a respective primary network output; an amplifier having a respective amplifier input connected to the primary network output, and a respective amplifier output connected to the receiver; and a feedback network connected between the amplifier input and the amplifier output. The primary network, the amplifier, and feedback network are arranged to provide a virtual ground at the amplifier input.

A further aspect of the present invention provides a modem comprising: a communications circuit for coupling a signal source of the modem to a telecommunications network, the communications circuit comprising a signal line adapted to simultaneously carry a transmit (Tx) signal sourced from a line driver circuit and a receive (Rx) signal having a frequency differing from that of the Tx signal and a compensation network connected to an output of the line driver for balancing an impedance of the signal line; and a directional coupler for coupling a signal receiver of the modem to the communications circuit. The directional coupler circuit comprises: a primary network connected to the communications circuit and having a respective primary network output; an amplifier having a respective amplifier input connected to the primary network output, and a respective amplifier output connected to the receiver; and a feedback network connected between the amplifier input and the amplifier output. The primary network, the amplifier, and feedback network are arranged to provide a virtual ground at the amplifier input.

Preferably, the primary network and feedback network are adapted to cooperate to provide a notch filter characteristic of the directional coupler circuit, the notch filter characteristic having a center frequency substantially corresponding to a frequency of the Tx signal. Alternatively, the primary network and feedback network can be adapted to cooperate to provide a 2nd order chebychev filter characteristic.

In an embodiment of the invention, the primary network comprises: a first input connected to the signal line for receiving a mixed signal; a second input operatively connected to the compensation network for receiving a compensation signal; and a filter network connected between the first and second filter inputs and the primary network output.

In an embodiment of the invention, the filter network comprises a partially-split 4-port RC network connected between the first and second inputs and the primary network output. Preferably, the partially-split 4-port RC network comprises: an output portion comprising a resistor and a capacitor connected in parallel to the primary network output; and a pair of input portions connected between respective ones of the first and second inputs and the output portion, each input portion comprising a resistor connected in series with the resistor of the output portion, and a capacitor connected in series with the capacitor of the output portion. Still more preferably, the partially-split 4-port RC network further comprises: a resistor connected between ground and a junction between the capacitors of the input and output portions; and a capacitor connected between ground and a junction between the resistors of the input and output portions.

In another embodiment of the invention, the primary network comprises a 4-port RC network connected to the first and second inputs via respective first and second resistances. Preferably, the 4-port RC network comprises first and second branches connected in parallel, the first branch comprising a pair of series connected resistors and a capacitor connected between ground and a junction between the series connected resistors; and the second branch comprising a pair of series connected capacitors and a resistor connected between ground and a junction between the series connected capacitors.

In a still further embodiment of the invention, the primary network comprises: a first 4-port RC network connected between the first input and the primary network output; and a second 4-port RC network connected between the second input and the primary network output. Preferably, each 4-port RC network comprises first and second branches connected in parallel, the first branch comprising a pair of series connected resistors and a capacitor connected between ground and a junction between the series connected resistors; and the second branch comprising a pair of series connected capacitors and a resistor connected between ground and a junction between the series connected capacitors.

In an embodiment of the invention, the feedback network comprises first and second branches connected in parallel, the first branch comprising a pair of series connected resistors and a capacitor connected between ground and a junction between the series connected resistors; and the second branch comprising a capacitor.

In an embodiment of the invention, the primary network output comprises a controllable gain stage. Preferably, the controllable gain stage comprises an attenuation network connected in parallel with a gain control switch. The attenuation network is preferably adapted to attenuate a signal substantially without altering the filter characteristic of the directional coupler. The attenuation network can comprise a pair of series connected resistors, and a capacitor connected in parallel with one of the pair of series connected resistors. Preferably, the gain control switch is adapted to selectively bypass the attenuation network.

BRIEF DESCRIPTION OF THE DRAWINGS

Further features and advantages of the present invention will become apparent from the following detailed description, taken in combination with the appended drawings, in which:

FIG. 4 schematically illustrates a fully balanced hybrid circuit incorporating a pair of directional couplers in accordance with the embodiment shown in FIG. 3a;

FIG. 5 schematically illustrates a second fully balanced hybrid circuit incorporating a pair of directional couplers in accordance with the embodiment shown in FIG. 3a;

It will be noted that throughout the appended drawings, like features are identified by like reference numerals.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the art.

Figure 1A:
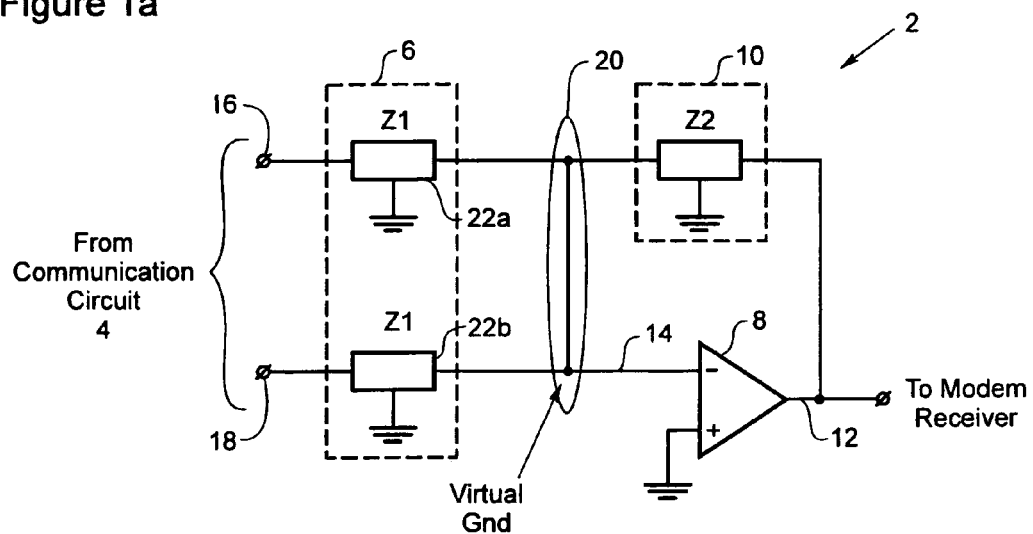
FIGS. 1a to 1c schematically illustrate basic elements in a directional coupler in accordance with an embodiment of the present invention.

The present invention provides a directional coupler circuit 2, as shown in FIG. 1a, usable in a hybrid circuit of a modem. The directional coupler 2 enables the modem receiver (demodulator) to be connected to a communication circuit 4 of a frequency-duplexed two wire transmission system. The directional coupler 2 achieves both directional isolation and significant frequency discrimination to reduce the level of transmitted signal contamination which must be handled by the receiver. The directional coupler 2 generally comprises a primary stage 6; an amplifier 8 coupled between the primary stage 6 and the modem receiver (not shown); and a feedback network 10 coupled between the output 12 and input 14 of the amplifier 8. Preferably, the primary stage 6 includes first and second inputs 16, 18 for connection with the communications circuit 4; a primary stage output 20 connected between an amplifier 8 and feedback network 10; and at least one filter network coupling the first and second inputs 16, 18 to the primary stage output 20. In the embodiment of FIG. 1a, the primary stage comprises a pair of filter networks 22a, 22b connected in parallel.

Figure 1B:
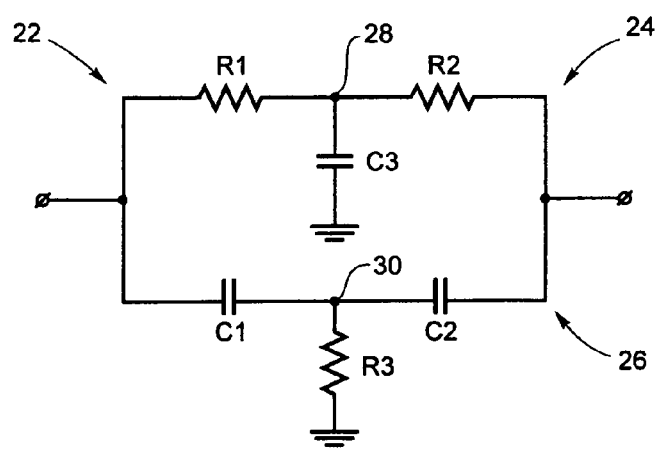

As shown in FIG. 1b, each filter network 22 is a 4-port resistor-capacitor (RC) network consisting of a resistor branch 24 connected in parallel with a capacitor branch 26. The resistor branch 24 includes a pair of series connected resistors R1 and R2, and a capacitor C3 connected between ground and a junction 28 between the two resistors R1 and R2. Similarly, the capacitor branch 26 includes a pair of series connected capacitors C1 and C2 and a resistor R3 connected between ground and a junction 30 between the two capacitors C1, C2. Those skilled in the art will understand that the filter network 22 has the same structure as a twin-T notch filter. In fact, the filter network 22 preferably provides a notch filter characteristic, and preferably attenuates frequencies in the frequency band of transmit signals sent by the modem through the communications circuit 4. However, the behavior of the filter network 22 differs significantly from that of a classical twin-T notch filter, in that the shape of the filter characteristic is determined by an interaction between the filter network 22 and the feedback network 10 of the directional coupler 2. The presence of the virtual ground 20 at the amplifier input 14 also has an impact on its behavior.

Figure 1C:
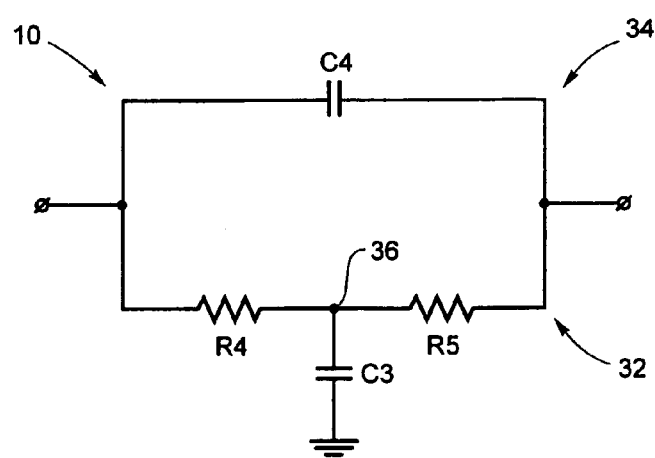

As shown in FIG. 1c, the feedback network 10 preferably includes a modified 4-pole RC network having a resistor branch 32 and a capacitor branch 34. As in the primary stage filter network 22 described above, the resistor branch 32 comprises a pair of series connected resistors R4 and R5, and a capacitor C5 connected between ground and the junction 36 between the two resistors R4, R5. However, in the feedback network 10, the capacitor branch 34 comprises a single capacitor C4 connected in parallel with the resistor branch 32, and lacks a ground connection. This structure of the feedback network 10 also provides a filtering characteristic, and preferably also attenuates signals in the frequency band of the transmit signals. As mentioned above, the overall shape of the filter characteristic of the directional coupler 2 is determined by interaction between the feedback network 10 and the primary stage filter network(s) 22. Preferably, the overall shape of the notch filter characteristic is a 2nd order elliptic function. However, a 2nd order chebychev filter characteristic is also usable in the present invention.

The amplifier 8, which may be a conventional operational amplifier, is connected between the primary stage output 20 and the modem receiver (demodulator—not shown), in parallel with the feedback network 10.

The overall structure of the directional coupler 2 illustrated in FIGS. 1a–c may be referred to as a "single feedback bi-quad" having the following characteristics:

a virtual ground at the amplifier input 14 eliminates common mode voltage at the amplifier input 14;

signals input at the first and second primary stage inputs 16, 18 are summed, to thereby enable extraction of receive signals from the mixed signals in the communications circuit 4; and the primary stage filter network(s) 22 and the feedback network 10 cooperate to provide significant filtering (filtering power of a complex pole plus a complex zero) and gain reduction applied to the signal prior to the amplifier 8. This reduces the voltage handling and linearity requirements of the amplifier 8 and the modem receiver (not shown), with consequent reductions in power consumption.

It will be understood that there are many circuits which possess a virtual ground, and therefore reduce distortion possibly due to common mode effects. However, the single feedback bi-quad structure of the present invention has a further advantage that current input to the summing point from the signals at the primary stage inputs 16, 18 is minimized over a significant part of the overall reject band. This reduces the current which must be provided from the amplifier output 12 via the feedback network 10, and thus further reduces the possibility of distortion. Additionally, the amplifier 8 does not need to exhibit a high open-loop gain in this part of the band.

Figure 2:
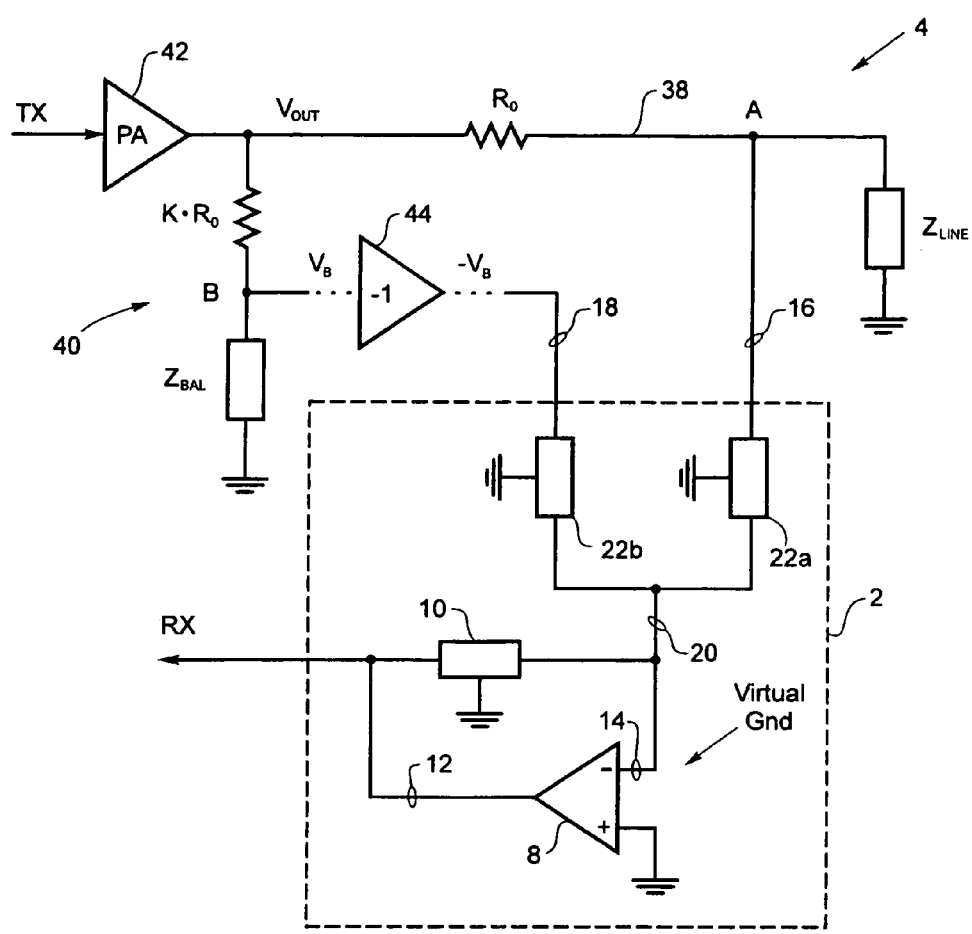
FIG. 2 schematically illustrates a modem hybrid circuit incorporating the directional coupler shown in FIG. 1.

FIG. 2 illustrates the directional coupler of FIGS. 1a–c connected to a conventional communications circuit (hybrid) of a modem. In the illustrated embodiment, the communications circuit 4 includes a signal line 38 and a compensation network 40. The signal line 38 comprises a transmit line driver 42 which drives a line transformer through an impedance (e.g., a resistance) $R_0$. For convenience, the impedance of the line transformer and local loop are represented by an impedance (e.g., principally an inductance) $Z_{LINE}$. The compensation network 40 is connected to the output of the line driver 42, and is designed to balance $R_0$ and $Z_{LINE}$. Thus in the illustrated embodiment, the compensation network 40 consists of impedances $kR_0$ and $Z_{BAL}$, which are arranged symmetrically about the line driver 42 with respect to $R_0$ and $Z_{LINE}$.

As shown in FIG. 2, the directional coupler 2 is connected to the communications circuit 4 by connecting the first and second primary stage inputs 16, 18 to the communications circuit at points A and B respectively. The first input 16, connected at point A, receives a mixed signal carried on the signal line 38, including the transmit (Tx) signal generated by the line driver 42, and receive signals received through the line transformer. The second input 18 is coupled to the compensation network 40 at point B, and thus receives a compensation signal. By virtue of the symmetry between the signal line 38 and compensation network 40, the compensation signal contains the Tx signal having a strength directly proportional (preferably equal) to the transmit signal component of the mixed signal obtained at point A of the signal line 38. However, receive signals received through the line transformer are attenuated by $R_0$ and $kR_0$, so that the level of the receive signal component of the compensation signal is significantly lower than that of the mixed signal. The compensation signal is preferably inverted by an inverter 44 which, if desired, may also act to adjust the amplitude of the compensation signal prior to its being applied to the primary stage filter network 22b.

Using the above structure, the receive signals can be extracted from the mixed signal by summing the mixed and compensation signals received at the first and second inputs 16, 18 of the primary stage 6. This arrangement eliminates common mode noise at the input 14 of the amplifier 8, so the receive signal (and the receiver itself) is well protected against common mode noise. Transmit signal leakage (due to unavoidable imbalance between the line impedance ($Z_{LINE}$) and the compensation network impedance ($Z_{BAL}$) is effectively filtered by the combination of the primary stage filter network 22 and feedback network 10, before being applied to the amplifier input 14, so distortion components are significantly reduced. The structure of the invention permits up to a second order elliptic function which has good rejection properties, further improving the distortion. The primary stage filter network(s) 22 and feedback network 10 of this single feedback bi-quad structure can be configured to implement either a high pass or a low pass response. Consequently, this same arrangement can be equally applied to a modem serving a host computer (e.g., at a customer premises), and a modem in a central office, or some other remote location.

Figure 3A:
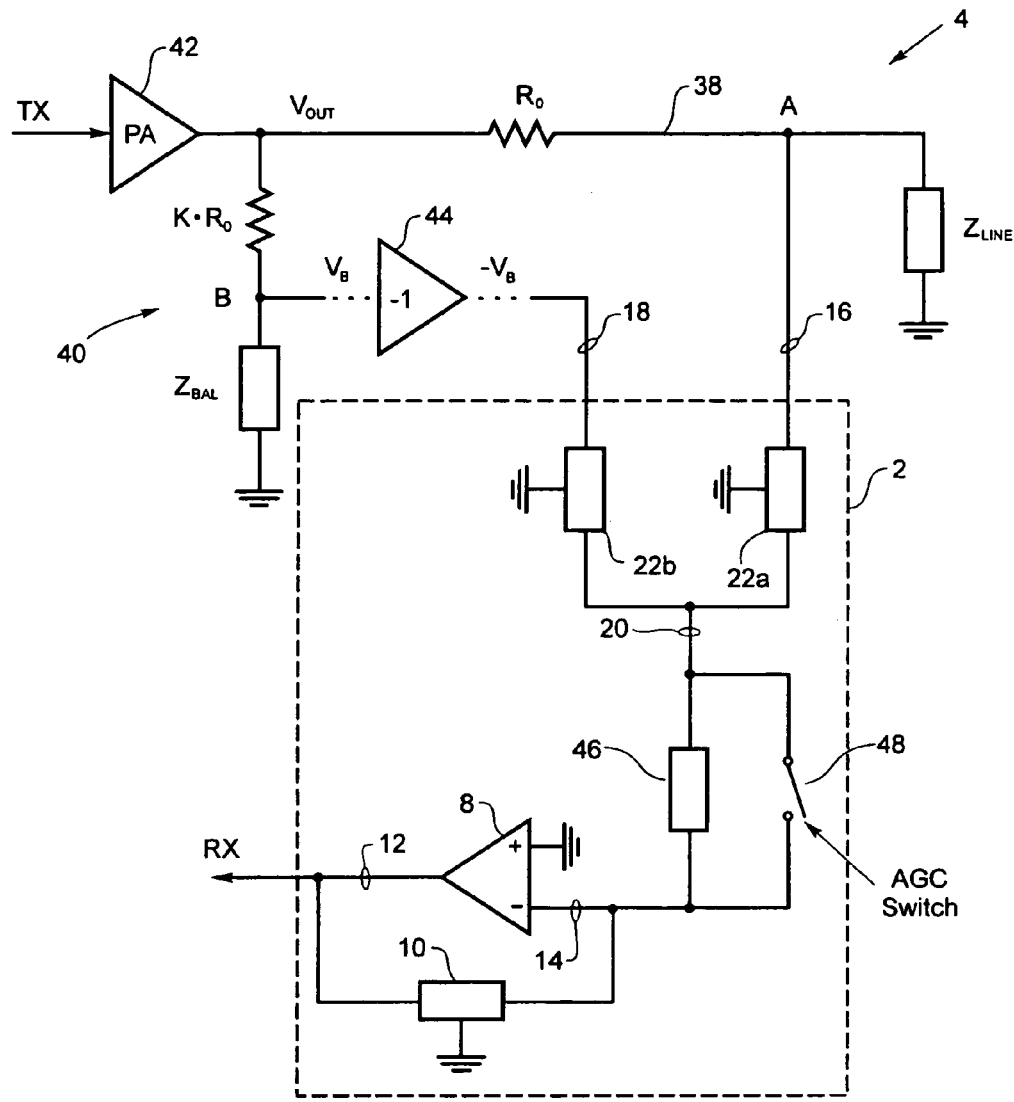
FIGS. 3a and 3b schematically illustrate a modem hybrid circuit incorporating a directional coupler in accordance with a second embodiment of the present invention.
Figure 3B:
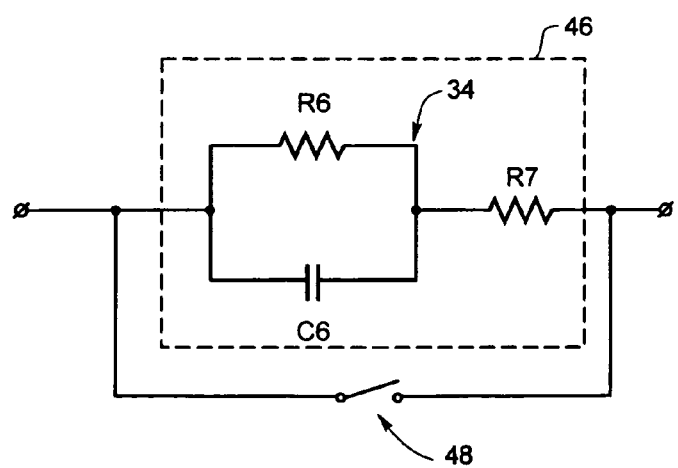

As shown in FIG. 3 the primary stage 6 can be readily modified to implement receive signal gain control functionality, with either gain or attenuation. Preferably, this is accomplished by adding a controllable gain stage 46 connected between the filter network(s) 22a, b and the input 14 of the amplifier 8. The controllable gain stage 46 includes an attenuation network 34 (FIG. 3b) connected in parallel with a gain control switch 48. As shown in FIG. 3b, the attenuation network 34 preferably includes a pair of series connected resistors R6, R7, and a capacitor C6 connected in parallel with the resistor R6. This arrangement provides attenuation of the receive signal (of, for example, approximately 3 dB), without significantly altering the shape of the in-band filter characteristic provided by the combination of the filter network(s) 22 and feedback network 10. The gain control switch 48 is connected to bypass the attenuation network 34, and thereby enables control of receive signal attenuation by the modem.

Figure 4:
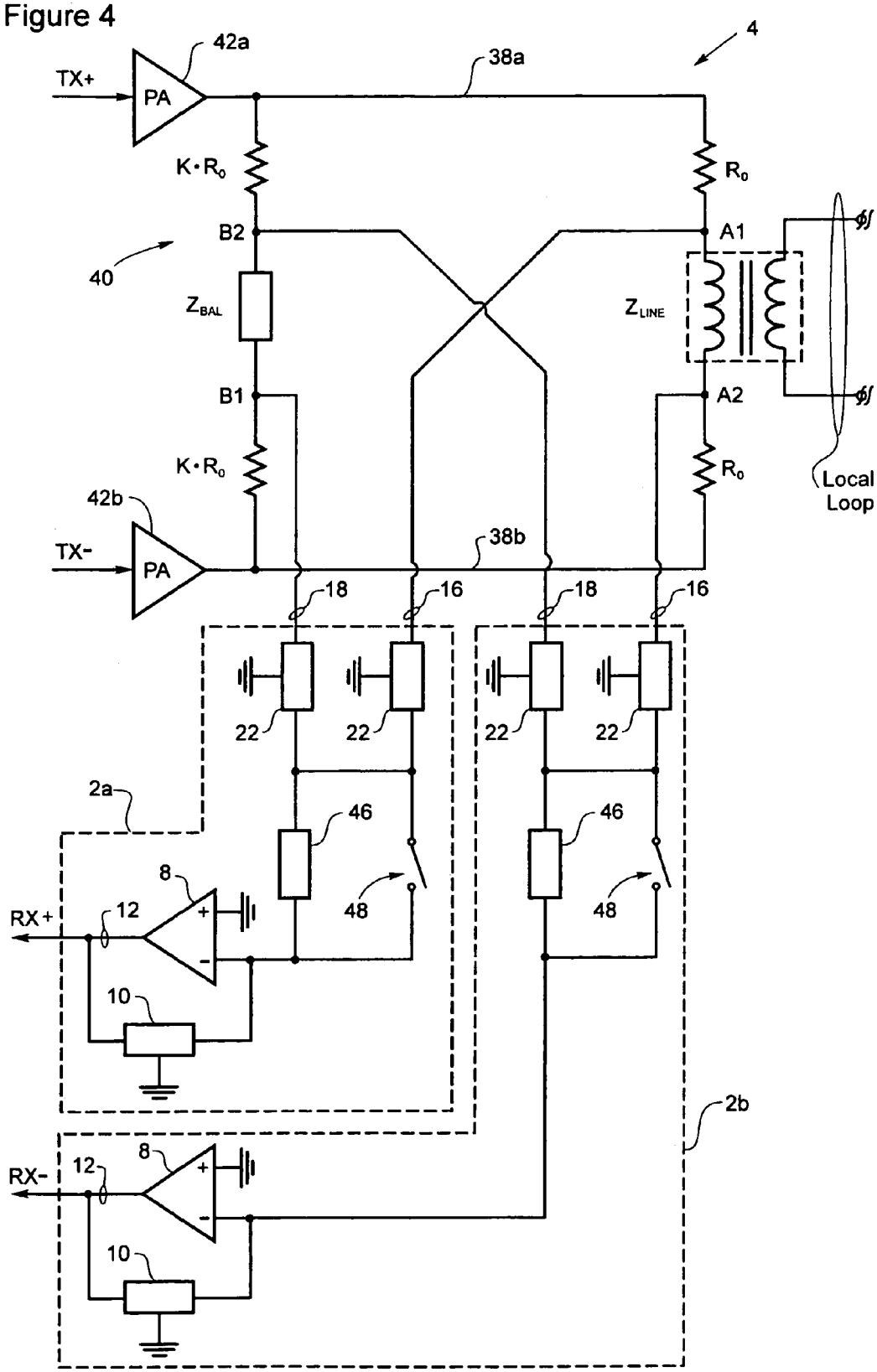
Figure 5:
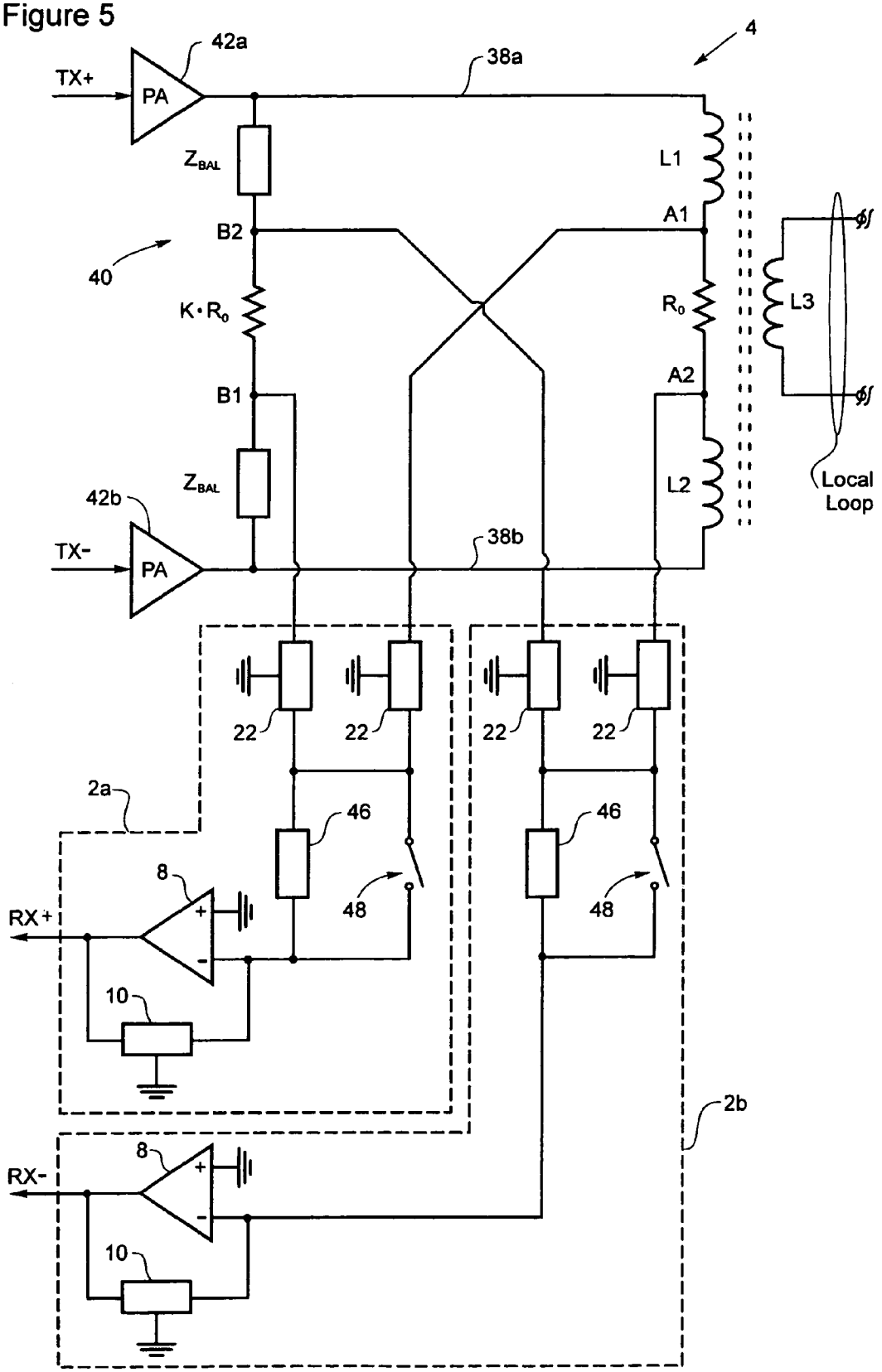

FIGS. 4 and 5 show respective exemplary implementations in which the directional coupler 2 of FIG. 3a is coupled for use in fully balanced communications circuits 4. As is known in the art, in a fully balanced communication circuit complementary transmit signals (Tx+ and Tx−) are generated by respective line drivers and used to drive opposite sides of the line transformer. A compensation network is provided for impedance matching, and is conveniently connected as a bridge between the respective signal lines carrying the complementary transmit signals.

In the embodiment shown in FIG. 4, each of the two signal lines 38a, 38b (connecting respective line drivers 42a, 42b and the line transformer ($Z_{LINE}$) includes a respective resistance $R_0$. The compensation network 40 forms a bridge between the signal lines 38a, 38b, and, in order to maintain symmetry with the signal lines 38a, 38b and line transformer $Z_{LINE}$, includes an inductance $Z_{BAL}$ series connected between two resistances $kR_0$. Due to the symmetry of the communications circuit 4, and the fact that the transmit signal Tx− is inverted with respect to its complementary transmit signal Tx+, the signals obtained at points A1 and B1 will be inverted with respect to each other, and will also be inverted with respect to the corresponding signals obtained at A2 and B2.

Using this arrangement, a receive signal Rx+ can be obtained by connecting a directional coupler 2a so that one of the primary stage inputs 16 is connected to a "positive" signal line 38a at point A1 to thereby receive a "positive" mixed signal. The other primary stage input 18 is connected to the compensation network 40 at point B1, and therefore receives a "negative" compensation signal (i.e., which is inverted with respect to the "positive" mixed signal obtained at point A1). Similarly, a "negative" receive signal Rx− can be generated by connecting a second directional coupler 2b to points A2 ("negative" mixed signal) and B2 ("positive" compensation signal) as shown in FIG. 4. It will be apparent that the use of inverters 44 to invert the compensation signals, as shown in FIGS. 2 and 3a, are not necessary with a fully balanced communication circuit 4, as inverted compensation signals can be obtained by tapping the compensation network 40 at appropriate points.

The embodiment shown in FIG. 5 is similar to that shown in FIG. 4, except that each signal line 38a, 38b includes a respective line transformer coil L1 and L2, which are separated by a resistance $R_0$. In order to maintain symmetry, the arrangement of inductances $Z_{BAL}$ and resistances $kR_0$ of the compensation network 40 is reversed (with respect to the embodiment shown in FIG. 4). As in the embodiment of FIG. 4, a compensation signal obtained at point B1 of the compensation network 40 is inverted with respect to the mixed signal obtained at point A1 of signal line 38a. Similarly, a compensation signal obtained at B2 is inverted with respect to a mixed signal obtained at A2 of signal line 38b. Thus complementary receive signals Rx+ and Rx− can be extracted by connecting respective directional couplers 2a, 2b to the communications circuit 4 in the manner discussed above with respect to FIG. 4.

Figure 6:
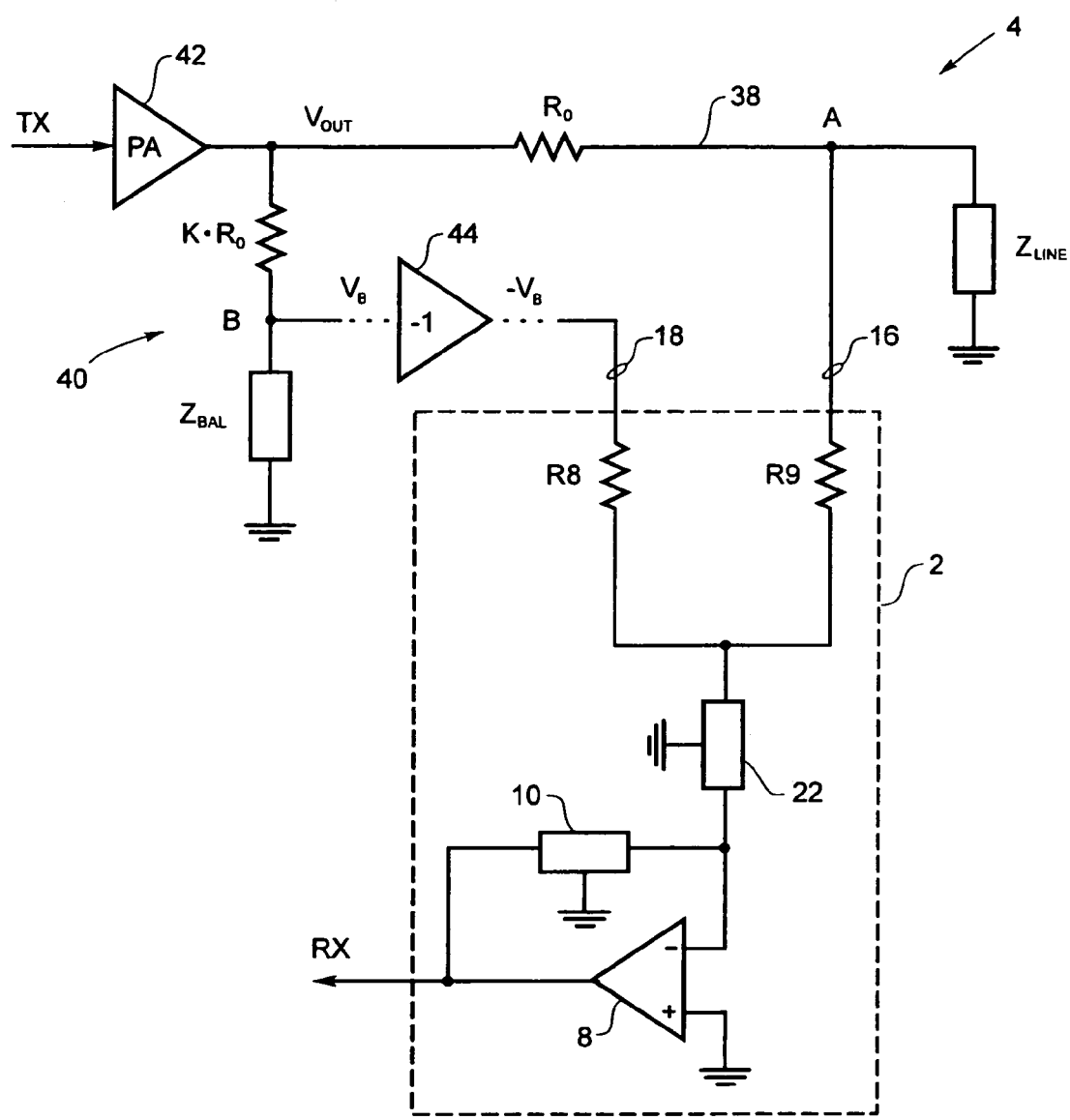
FIG. 6 schematically illustrates a modem hybrid circuit incorporating a directional coupler in accordance with a third embodiment of the present invention.
Figure 7:
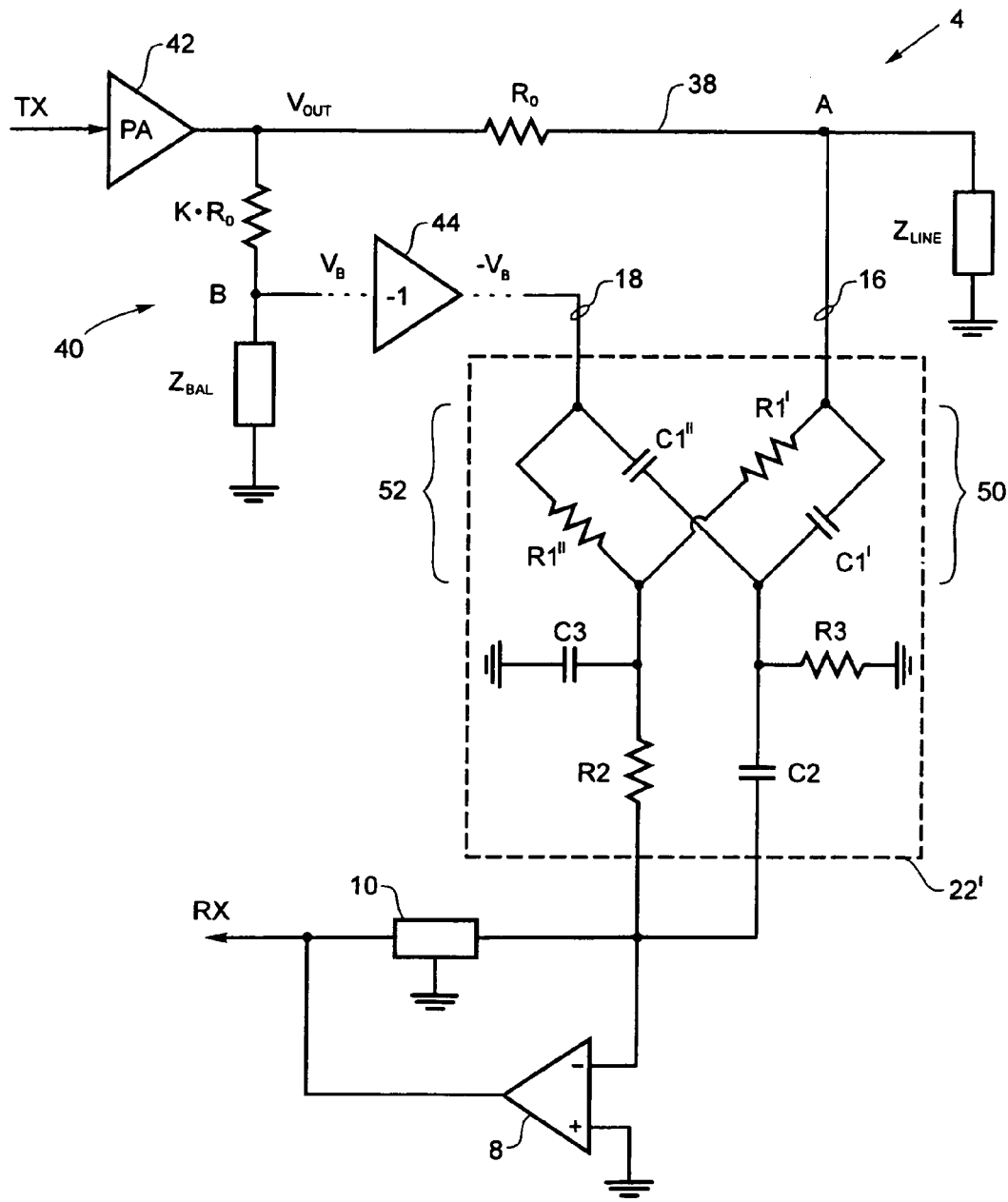
FIG. 7 schematically illustrates a modem hybrid circuit incorporating a directional coupler in accordance with a fourth embodiment of the present invention.

FIGS. 6 and 7 respectively show alternative embodiments of a directional coupler 2 in accordance with the present invention. For simplicity, in each case the directional coupler 2 is shown connected to a simple (unbalanced) communications circuit 4, in the manner illustrated in FIGS. 2 and 3. Furthermore, attenuation networks 46 have been omitted from these embodiments. It will be appreciated, however, that the embodiments of FIGS. 6 and 7 can be readily applied to fully balanced communications circuits 4, by connecting the primary stage inputs 16, 18 to appropriate points on the signal line 38 and compensation network 40 as discussed above with respect to FIGS. 4 and 5. Similarly, attenuation networks 46 can be readily inserted between the filter network 22 and the amplifier input 14 if desired.

In the embodiment shown in FIG. 6, the primary stage is modified by eliminating one filter network 22, and connecting the remaining filter network 22 to both of the primary stage inputs 16, 18 via respective resistances R8, R9. This reduces the parts count and component cost, by removing the problem of component matching between two parallel filter networks 22*a*, 22*b*. However, the additional resistances, and the fact that the mixed and compensation signals are summed upstream of the remaining filter network 22, may result in some alteration of the overall filter characteristics produced by the combination of the remaining filter network 22 and feedback network 10.

The embodiment shown in FIG. 7 enables a reduced parts count, and reduces the problem of component matching (both relative to the case of two parallel filter networks 22*a*, *b*) by using a partially split filter network 22'. The filter network 22' can be considered to have an input end and an output end. Referring briefly to FIG. 1*a*, the input end comprises a resistor (R1) and a capacitor (C1) proximal the inputs 16, 18 of the primary stage 6. The remainder of the filter network 22', which consists of resistors R2 and R3, and capacitors C2 and C3, forms the output end. As shown in FIG. 7, the input end of the filter network 22' is split into two equal input branches 50 and 52 both of which are connected to the output end, which remains unmodified. Thus, the input resistor R1 of the filter network(s) 22 (see FIG. 1*b*) is replaced by two parallel resistances R1', R1", each having a resistance value twice that of R1. The input capacitor C1 is replaced by two parallel capacitors C1', C1" each having a capacitance value one half that of C1.

Each input branch 50, 52 of the partially split filter network 22' is connected to a respective primary stage input 16, 18. Thus one input branch 50 receives the mixed signal from the signal line 38 of the communication circuit 4, while the other input branch 52 receives the compensation signal from the compensation network 40. By suitably matching component values between each input branch 50, 52 of the partially split filter network 22', the original filter characteristics (i.e., the filter characteristics obtained with two parallel filter networks 22) can be preserved. However, because the output end of the filter network 22' does not have to be duplicated, the total parts count and the difficulties associated with component matching between two parallel filter networks 22*a*, 22*b* are reduced.

The embodiments of the invention described above are intended to be exemplary only. The scope of the invention is therefore intended to be limited solely by the scope of the appended claims.

We claim:

1. A modem comprising:
  a) a communications circuit for coupling a signal source of the modem to a telecommunications network, the communications circuit comprising a signal line adapted to simultaneously carry a transmit (Tx) signal and a receive (Rx) signal and a compensation network connected to the signal line for balancing an impedance of the signal line; and
  b) a directional coupler for coupling a signal receiver of the modem to the communications circuit, the directional coupler circuit comprising:
    i) a primary network connected to the communications circuit, the primary network being tuned to attenuate frequencies in a frequency band of the Tx signal, and having a respective primary network output;
    ii) an amplifier having a respective amplifier input connected to the primary network output, and a respective amplifier output connected to the receiver; and
    iii) a feedback network tuned to attenuate frequencies in a frequency band of the Tx signal, and connected between the amplifier input and the amplifier output;
  wherein the primary network, the amplifier, and feedback network are arranged to provide a virtual ground at the amplifier input.

2. The modem as claimed in claim 1, wherein the signal line comprises first and second signal line impedances connected in series between a transmit line driver and the local loop, the first input being connected to the signal line between the first and second signal line impedances.

3. The modem as claimed in claim 2, wherein the first signal line impedance is a resistor, and the second signal line impedance is an inductance.

4. The modem as claimed in claim 3, wherein the second signal line impedance comprises a coil of a line transformer connecting the signal line to the local loop.

5. The modem as claimed in claim 2, wherein the compensation network comprises first and second compensation impedances connected in series, the second input being connected to the compensation network between the first and second compensation impedances.

6. The modem as claimed in claim 5, wherein the first compensation impedance is a resistor, and the second compensation impedance is an inductance.

7. The modem as claimed in claim 1, wherein the primary network and the feedback network are adapted to cooperate to provide a notch filter characteristic of the directional coupler, the notch filter characteristic having a center frequency substantially corresponding to a frequency of the Tx signal.

8. The modem as claimed in claim 1, wherein the primary network comprises:
  a) a first input connected to the signal line for receiving a mixed signal;
  b) a second input operatively connected to the compensation network for receiving a compensation signal; and
  c) a filter network connected between the first and second inputs and the primary network output.

9. The modem as claimed in claim 8, wherein the filter network comprises a partially-split 4-port resistor-capacity (RC) network connected between the first and second filter inputs and the primary network output.

10. The modem as claimed in claim 9, wherein the partially-split 4-port RC network comprises:
  a) an output portion comprising a resistor and a capacitor connected in parallel to the primary network output; and
  b) a pair of input portions connected between respective ones of the first and second inputs and the output portion, each input portion comprising a resistor connected in series with the resistor of the output portion, and a capacitor connected in series with the capacitor of the output portion.

11. The modem as claimed in claim 10, wherein the partially-split 4-port RC network further comprises:
  a) a resistor connected between ground and a junction between the capacitors of the input and output portions; and
  b) a capacitor connected between ground and a junction between the resistors of the input and output portions.

12. The modem as claimed in claim 9, wherein the filter network comprises a 4-port RC network connected to the first and second inputs via respective first and second resistances.

13. The modem as claimed in claim 12, wherein the 4-port RC network comprises first and second branches connected in parallel, the first branch comprising a pair of series connected resistors and a capacitor connected between ground and a junction between the series connected resistors; and the second branch comprising a pair of series connected capacitors and a resistor connected between ground and a junction between the series connected capacitors.

14. The modem as claimed in claim 9, wherein the filter network comprises:
   a) a first 4-port RC network connected between the first filter input and the primary network output; and
   b) a second 4-port RC network connected between the second filter input and the primary network output;.

15. The modem as claimed in claim 14, wherein each 4-port RC network comprises first and second branches connected in parallel, the first branch comprising a pair of series connected resistors and a capacitor connected between ground and a junction between the series connected resistors; and the second branch comprising a pair of series connected capacitors and a resistor connected between ground and a junction between the series connected capacitors.

16. The modem as claimed in claim 9, wherein the primary network output comprises a controllable gain stage.

17. The modem as claimed in claim 16, wherein the controllable gain stage comprises an attenuation network connected in parallel with a gain control switch.

18. The modem as claimed in claim 17, wherein the attenuation network is adapted to attenuate a signal substantially without altering a filter characteristic of the directional coupler.

19. The modem as claimed in claim 17, wherein the attenuation network comprises a pair of series connected resistors, and a capacitor connected in parallel with one of the pair of series connected resistors.

20. The modem as claimed in claim 17, wherein the gain control switch is adapted to selectively bypass the attenuation network.

21. The modem as claimed in claim 1, wherein the feedback network comprises first and second branches connected in parallel, the first branch comprising a pair of series connected resistors and a capacitor connected between ground and a junction between the series connected resistors; and the second branch comprising a capacitor.

* * * * *